(12) United States Patent
Kay

(10) Patent No.: US 8,799,388 B2
(45) Date of Patent: Aug. 5, 2014

(54) METHOD AND APPARATUS FOR ELECTRONIC MAIL FILTERING

(75) Inventor: James Kay, Crowthorne (GB)

(73) Assignee: Websense U.K. Limited, San Diego, CA (US)

( * ) Notice: Subject to any disclaimer, the term of this patent is extended or adjusted under 35 U.S.C. 154(b) by 0 days.

(21) Appl. No.: 13/584,495

(22) Filed: Aug. 13, 2012

(65) Prior Publication Data

US 2012/0311058 A1    Dec. 6, 2012

Related U.S. Application Data

(63) Continuation of application No. 12/600,631, filed as application No. PCT/GB2008/050347 on May 13, 2008, now Pat. No. 8,244,817.

(30) Foreign Application Priority Data

May 18, 2007    (GB) .................................. 0709527.6

(51) Int. Cl.
*G06F 15/16*    (2006.01)
*H04L 12/58*    (2006.01)

(52) U.S. Cl.
CPC ............... *H04L 51/22* (2013.01); *H04L 51/12* (2013.01); *H04L 51/26* (2013.01); *H04L 12/585* (2013.01)
USPC .............................. 709/206; 709/207; 726/22

(58) Field of Classification Search
USPC ..................................... 709/206–207; 726/22
See application file for complete search history.

(56) References Cited

U.S. PATENT DOCUMENTS

| | | | |
|---|---|---|---|
| 4,423,414 A | 12/1983 | Bryant et al. |
| 4,734,036 A | 3/1988 | Kasha |
| 4,941,084 A | 7/1990 | Terada et al. |
| 5,333,266 A | 7/1994 | Boaz et al. |

(Continued)

FOREIGN PATENT DOCUMENTS

| | | |
|---|---|---|
| EP | 0 658 837 A2 | 12/1994 |
| EP | 0 748 095 | 12/1996 |

(Continued)

OTHER PUBLICATIONS

Great Britain Search Report for Application No. GB0512744.4, UKIPO, Oct. 2005.

(Continued)

*Primary Examiner* — Alina N Boutah
(74) *Attorney, Agent, or Firm* — Knobbe Martens Olson & Bear, LLP

(57) ABSTRACT

Messages having a reputation score higher than at least one message already on a queue are added to the queue when the queue has already reached the predetermined maximum permitted size. One or more messages having a low reputation score may be discarded from a bottom of the queue in favor of a new incoming message having a higher reputation score. This may be particularly useful in the context of Internet e-mail, wherein mail delivery protocols (i.e. SMTP) allow a connection for an incoming message to be held open for a limited time period and during this period the message processing apparatus does not assume responsibility for onward transmission of the message. Thus, the message processing apparatus is able to selectively accept only those messages having a highest reputation score for detailed analysis, without adversely affecting the operations performed by other parts of the electronic messaging system.

21 Claims, 5 Drawing Sheets

(56) References Cited

U.S. PATENT DOCUMENTS

| | | |
|---|---|---|
| 5,408,642 A | 4/1995 | Mann |
| 5,414,833 A | 5/1995 | Hershey et al. |
| 5,493,692 A | 2/1996 | Theimer et al. |
| 5,541,911 A | 7/1996 | Nilakantan et al. |
| 5,548,729 A | 8/1996 | Akiyoshi et al. |
| 5,555,376 A | 9/1996 | Theimer et al. |
| 5,581,703 A | 12/1996 | Baugher et al. |
| 5,581,804 A | 12/1996 | Cameron et al. |
| 5,586,121 A | 12/1996 | Moura et al. |
| 5,590,403 A | 12/1996 | Cameron et al. |
| 5,596,330 A | 1/1997 | Yokev et al. |
| 5,606,668 A | 2/1997 | Shwed |
| 5,619,648 A | 4/1997 | Canale et al. |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,712,979 A | 1/1998 | Graber et al. |
| 5,720,033 A | 2/1998 | Deo |
| 5,724,576 A | 3/1998 | Letourneau |
| 5,742,769 A | 4/1998 | Lee et al. |
| 5,768,519 A | 6/1998 | Swift et al. |
| 5,774,668 A | 6/1998 | Choquier |
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,835 A | 10/1998 | Isfeld et al. |
| 5,832,212 A | 11/1998 | Cragun et al. |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,896,502 A | 4/1999 | Shieh et al. |
| 5,899,991 A | 5/1999 | Karch |
| 5,899,995 A | 5/1999 | Millier et al. |
| 5,911,043 A | 6/1999 | Duffy et al. |
| 5,919,257 A | 7/1999 | Trostle |
| 5,937,404 A | 8/1999 | Csaszar et al. |
| 5,941,947 A | 8/1999 | Brown et al. |
| 5,944,794 A | 8/1999 | Okamoto et al. |
| 5,950,195 A | 9/1999 | Stockwell et al. |
| 5,958,015 A | 9/1999 | Dascalu |
| 5,961,591 A | 10/1999 | Jones et al. |
| 5,963,941 A | 10/1999 | Hirakawa |
| 5,968,176 A | 10/1999 | Nessett et al. |
| 5,978,807 A | 11/1999 | Mano et al. |
| 5,983,270 A | 11/1999 | Abraham et al. |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 5,999,929 A | 12/1999 | Goodman |
| 6,012,832 A | 1/2000 | Saunders et al. |
| 6,052,723 A | 4/2000 | Ginn |
| 6,052,730 A | 4/2000 | Felciano et al. |
| 6,055,564 A | 4/2000 | Phaal |
| 6,058,389 A | 5/2000 | Chandra et al. |
| 6,065,056 A | 5/2000 | Bradshaw et al. |
| 6,065,059 A | 5/2000 | Shieh et al. |
| 6,070,242 A | 5/2000 | Wong et al. |
| 6,073,135 A | 6/2000 | Broder et al. |
| 6,073,239 A | 6/2000 | Dotan |
| 6,085,241 A | 7/2000 | Otis |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,178,505 B1 | 1/2001 | Schneider et al. |
| 6,182,118 B1 | 1/2001 | Finney et al. |
| 6,185,681 B1 | 2/2001 | Zizzi |
| 6,219,667 B1 | 4/2001 | Lu et al. |
| 6,233,618 B1 | 5/2001 | Shannon |
| 6,233,686 B1 | 5/2001 | Zenchelsky et al. |
| 6,246,977 B1 | 6/2001 | Messerly et al. |
| 6,253,188 B1 | 6/2001 | Witek et al. |
| 6,266,664 B1 | 7/2001 | Russell-Falla et al. |
| 6,295,529 B1 | 9/2001 | Corston-Oliver et al. |
| 6,295,559 B1 | 9/2001 | Emens et al. |
| 6,301,658 B1 | 10/2001 | Koehler |
| 6,338,088 B1 | 1/2002 | Waters et al. |
| 6,356,864 B1 | 3/2002 | Foltz et al. |
| 6,357,010 B1 | 3/2002 | Viets et al. |
| 6,377,577 B1 | 4/2002 | Bechtolsheim et al. |
| 6,389,472 B1 | 5/2002 | Hughes et al. |
| 6,418,433 B1 | 7/2002 | Chakrabarti et al. |
| 6,446,061 B1 | 9/2002 | Doerre et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,493,744 B1 | 12/2002 | Emens et al. |
| 6,493,758 B1 | 12/2002 | McLain |
| 6,519,571 B1 | 2/2003 | Guheen et al. |
| 6,539,430 B1 | 3/2003 | Humes |
| 6,571,249 B1 | 5/2003 | Garrecht et al. |
| 6,606,659 B1 | 8/2003 | Hegli et al. |
| 6,615,242 B1 | 9/2003 | Riemers |
| 6,654,787 B1 | 11/2003 | Aronson et al. |
| 6,675,169 B1 | 1/2004 | Bennett et al. |
| 6,741,997 B1 | 5/2004 | Liu et al. |
| 6,742,003 B2 | 5/2004 | Heckerman et al. |
| 6,785,732 B1 | 8/2004 | Bates et al. |
| 6,804,780 B1 | 10/2004 | Touboul |
| 6,807,558 B1 | 10/2004 | Hassett et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,894,991 B2 | 5/2005 | Ayyagari et al. |
| 6,944,772 B2 | 9/2005 | Dozortsev |
| 6,978,292 B1 | 12/2005 | Murakami et al. |
| 6,988,209 B1 | 1/2006 | Balasubramaniam et al. |
| 7,051,200 B1 | 5/2006 | Manferdelli et al. |
| 7,058,822 B2 | 6/2006 | Edery et al. |
| 7,065,483 B2 | 6/2006 | Decary et al. |
| 7,080,000 B1 | 7/2006 | Cambridge |
| 7,089,246 B1 | 8/2006 | O'Laughlen |
| 7,093,293 B1 | 8/2006 | Smithson et al. |
| 7,096,493 B1 | 8/2006 | Liu |
| 7,100,199 B2 | 8/2006 | Ginter et al. |
| 7,136,867 B1 | 11/2006 | Chatterjee et al. |
| 7,185,015 B2 | 2/2007 | Kester et al. |
| 7,185,361 B1 | 2/2007 | Ashoff et al. |
| 7,197,713 B2 | 3/2007 | Stern |
| 7,203,706 B2 | 4/2007 | Jain et al. |
| 7,209,893 B2 | 4/2007 | Nii |
| 7,213,069 B2 | 5/2007 | Anderson et al. |
| 7,219,299 B2 | 5/2007 | Fields et al. |
| 7,260,583 B2 | 8/2007 | Wiener et al. |
| 7,313,823 B2 | 12/2007 | Gao |
| 7,359,372 B2 | 4/2008 | Pelletier et al. |
| 7,373,385 B2 | 5/2008 | Prakash |
| 7,376,154 B2 | 5/2008 | Ilnicki et al. |
| 7,376,969 B1 | 5/2008 | Njemanze et al. |
| 7,447,215 B2 | 11/2008 | Lynch et al. |
| 7,487,217 B2 | 2/2009 | Buckingham et al. |
| 7,487,540 B2 | 2/2009 | Shipp |

(56) References Cited

U.S. PATENT DOCUMENTS

| | | | |
|---|---|---|---|
| 7,533,148 B2 * | 5/2009 | McMillan et al. | 709/206 |
| 7,536,437 B2 | 5/2009 | Zmolek | |
| 7,548,922 B2 | 6/2009 | Altaf et al. | |
| 7,562,304 B2 | 7/2009 | Dixon et al. | |
| 7,568,002 B1 | 7/2009 | Vacanti et al. | |
| 7,587,488 B2 | 9/2009 | Ahlander et al. | |
| 7,603,685 B2 | 10/2009 | Knudson et al. | |
| 7,603,687 B2 | 10/2009 | Pietraszak et al. | |
| 7,610,342 B1 | 10/2009 | Pettigrew et al. | |
| 7,627,670 B2 | 12/2009 | Haverkos | |
| 7,647,383 B1 * | 1/2010 | Boswell et al. | 709/207 |
| 7,660,861 B2 | 2/2010 | Taylor | |
| 7,664,819 B2 | 2/2010 | Murphy et al. | |
| RE41,168 E | 3/2010 | Shannon | |
| 7,690,013 B1 | 3/2010 | Eldering et al. | |
| 7,693,945 B1 | 4/2010 | Dulitz et al. | |
| 7,739,338 B2 | 6/2010 | Taylor | |
| 7,739,494 B1 | 6/2010 | McCorkendale et al. | |
| 7,783,597 B2 | 8/2010 | Kirsch | |
| 7,797,443 B1 | 9/2010 | Pettigrew et al. | |
| 7,870,203 B2 | 1/2011 | Judge et al. | |
| 7,899,866 B1 | 3/2011 | Buckingham et al. | |
| 7,904,958 B2 | 3/2011 | Lee | |
| 7,941,490 B1 | 5/2011 | Cowings | |
| 2001/0032205 A1 | 10/2001 | Kubaitis | |
| 2001/0032258 A1 | 10/2001 | Ishida et al. | |
| 2001/0039582 A1 | 11/2001 | McKinnon et al. | |
| 2001/0047343 A1 | 11/2001 | Dahan et al. | |
| 2001/0047474 A1 | 11/2001 | Takagi | |
| 2002/0042821 A1 | 4/2002 | Muret et al. | |
| 2002/0049883 A1 | 4/2002 | Schneider et al. | |
| 2002/0059221 A1 | 5/2002 | Whitehead et al. | |
| 2002/0062359 A1 | 5/2002 | Klopp et al. | |
| 2002/0073068 A1 | 6/2002 | Guha | |
| 2002/0073089 A1 | 6/2002 | Schwartz et al. | |
| 2002/0078045 A1 | 6/2002 | Dutta | |
| 2002/0087882 A1 | 7/2002 | Schneier et al. | |
| 2002/0091947 A1 | 7/2002 | Nakamura | |
| 2002/0095592 A1 | 7/2002 | Daniell et al. | |
| 2002/0099952 A1 | 7/2002 | Lambert et al. | |
| 2002/0110084 A1 | 8/2002 | Butt et al. | |
| 2002/0120705 A1 | 8/2002 | Schiavone et al. | |
| 2002/0129039 A1 | 9/2002 | Majewski et al. | |
| 2002/0129140 A1 | 9/2002 | Peled et al. | |
| 2002/0129277 A1 | 9/2002 | Caccavale | |
| 2002/0133509 A1 | 9/2002 | Johnston et al. | |
| 2002/0144129 A1 | 10/2002 | Malivanchuk et al. | |
| 2002/0152284 A1 | 10/2002 | Cambray et al. | |
| 2002/0174358 A1 | 11/2002 | Wolff et al. | |
| 2002/0178374 A1 | 11/2002 | Swimmer et al. | |
| 2002/0199095 A1 | 12/2002 | Bandini et al. | |
| 2003/0005112 A1 | 1/2003 | Krautkremer | |
| 2003/0009495 A1 | 1/2003 | Adjaoute | |
| 2003/0018903 A1 | 1/2003 | Greca et al. | |
| 2003/0023860 A1 | 1/2003 | Eatough et al. | |
| 2003/0028564 A1 | 2/2003 | Sanfilippo | |
| 2003/0074567 A1 | 4/2003 | Charbonneau | |
| 2003/0088577 A1 | 5/2003 | Thurnhofer et al. | |
| 2003/0093694 A1 | 5/2003 | Medvinsky et al. | |
| 2003/0097617 A1 | 5/2003 | Goeller et al. | |
| 2003/0110168 A1 | 6/2003 | Kester et al. | |
| 2003/0110272 A1 | 6/2003 | Du Castel et al. | |
| 2003/0126136 A1 | 7/2003 | Omoigui | |
| 2003/0126139 A1 | 7/2003 | Lee et al. | |
| 2003/0135756 A1 | 7/2003 | Verma | |
| 2003/0149692 A1 | 8/2003 | Mitchell | |
| 2003/0158923 A1 | 8/2003 | Burkhart | |
| 2003/0177187 A1 | 9/2003 | Levine et al. | |
| 2003/0177394 A1 | 9/2003 | Dozortsev | |
| 2003/0182420 A1 | 9/2003 | Jones et al. | |
| 2003/0182421 A1 * | 9/2003 | Faybishenko et al. | 709/224 |
| 2003/0185395 A1 | 10/2003 | Lee et al. | |
| 2003/0185399 A1 | 10/2003 | Ishiguro | |
| 2003/0229849 A1 | 12/2003 | Wendt | |
| 2004/0003139 A1 | 1/2004 | Cottrille et al. | |
| 2004/0003286 A1 | 1/2004 | Kaler et al. | |
| 2004/0006706 A1 | 1/2004 | Erlingsson | |
| 2004/0015566 A1 | 1/2004 | Anderson et al. | |
| 2004/0015586 A1 | 1/2004 | Hegli et al. | |
| 2004/0019656 A1 | 1/2004 | Smith | |
| 2004/0030913 A1 | 2/2004 | Liang et al. | |
| 2004/0034794 A1 | 2/2004 | Mayer et al. | |
| 2004/0049514 A1 | 3/2004 | Burkov | |
| 2004/0054498 A1 | 3/2004 | Shipp | |
| 2004/0054521 A1 | 3/2004 | Liu | |
| 2004/0062106 A1 | 4/2004 | Ramesh et al. | |
| 2004/0068479 A1 | 4/2004 | Wolfson et al. | |
| 2004/0078591 A1 | 4/2004 | Teixeira et al. | |
| 2004/0088570 A1 | 5/2004 | Roberts et al. | |
| 2004/0111499 A1 | 6/2004 | Dobrowski et al. | |
| 2004/0117624 A1 | 6/2004 | Brandt et al. | |
| 2004/0123157 A1 | 6/2004 | Alagna et al. | |
| 2004/0128285 A1 | 7/2004 | Green et al. | |
| 2004/0139160 A1 * | 7/2004 | Wallace et al. | 709/206 |
| 2004/0139165 A1 * | 7/2004 | McMillan et al. | 709/206 |
| 2004/0148524 A1 | 7/2004 | Airamo | |
| 2004/0153305 A1 | 8/2004 | Enescu et al. | |
| 2004/0153644 A1 | 8/2004 | McCorkendale | |
| 2004/0172389 A1 | 9/2004 | Galai et al. | |
| 2004/0181788 A1 | 9/2004 | Kester et al. | |
| 2004/0220918 A1 | 11/2004 | Scriffignano et al. | |
| 2004/0220924 A1 | 11/2004 | Wootton | |
| 2005/0015626 A1 | 1/2005 | Chasin | |
| 2005/0033967 A1 | 2/2005 | Morino et al. | |
| 2005/0044156 A1 * | 2/2005 | Kaminski et al. | 709/206 |
| 2005/0050222 A1 | 3/2005 | Packer | |
| 2005/0060140 A1 | 3/2005 | Maddox et al. | |
| 2005/0066197 A1 | 3/2005 | Hirata et al. | |
| 2005/0080855 A1 * | 4/2005 | Murray | 709/206 |
| 2005/0080856 A1 | 4/2005 | Kirsch | |
| 2005/0091535 A1 | 4/2005 | Kavalam et al. | |
| 2005/0108557 A1 | 5/2005 | Kayo et al. | |
| 2005/0120229 A1 | 6/2005 | Lahti | |
| 2005/0131868 A1 | 6/2005 | Lin et al. | |
| 2005/0132042 A1 | 6/2005 | Cryer | |
| 2005/0132184 A1 | 6/2005 | Palliyil et al. | |
| 2005/0138353 A1 | 6/2005 | Spies | |
| 2005/0155012 A1 | 7/2005 | Tayama et al. | |
| 2005/0188036 A1 | 8/2005 | Yasuda | |
| 2005/0210035 A1 | 9/2005 | Kester et al. | |
| 2005/0223001 A1 | 10/2005 | Kester et al. | |
| 2005/0251862 A1 | 11/2005 | Talvitie | |
| 2005/0256955 A1 | 11/2005 | Bodwell et al. | |
| 2005/0257261 A1 | 11/2005 | Shraim et al. | |
| 2005/0273858 A1 | 12/2005 | Zadok et al. | |
| 2005/0283836 A1 | 12/2005 | Lalonde et al. | |
| 2005/0283837 A1 | 12/2005 | Olivier et al. | |
| 2006/0004636 A1 | 1/2006 | Kester et al. | |
| 2006/0004717 A1 | 1/2006 | Ramarathnam et al. | |
| 2006/0010217 A1 | 1/2006 | Sood | |
| 2006/0026105 A1 | 2/2006 | Endoh | |
| 2006/0031311 A1 * | 2/2006 | Whitney et al. | 709/206 |
| 2006/0031359 A1 * | 2/2006 | Clegg et al. | 709/206 |
| 2006/0031504 A1 | 2/2006 | Hegli et al. | |
| 2006/0036874 A1 | 2/2006 | Cockerille et al. | |
| 2006/0053488 A1 | 3/2006 | Sinclair et al. | |
| 2006/0059238 A1 * | 3/2006 | Slater et al. | 709/206 |
| 2006/0068755 A1 | 3/2006 | Shraim et al. | |
| 2006/0069697 A1 | 3/2006 | Shraim et al. | |
| 2006/0075072 A1 | 4/2006 | Sinclair et al. | |
| 2006/0075494 A1 | 4/2006 | Bertman et al. | |
| 2006/0075500 A1 | 4/2006 | Bertman et al. | |
| 2006/0080735 A1 | 4/2006 | Brinson et al. | |
| 2006/0095404 A1 | 5/2006 | Adelman et al. | |
| 2006/0095459 A1 | 5/2006 | Adelman et al. | |
| 2006/0095586 A1 | 5/2006 | Adelman et al. | |
| 2006/0095965 A1 | 5/2006 | Phillips et al. | |
| 2006/0101514 A1 | 5/2006 | Milener et al. | |
| 2006/0122957 A1 | 6/2006 | Chen | |
| 2006/0129644 A1 | 6/2006 | Owen et al. | |
| 2006/0161986 A1 | 7/2006 | Singh et al. | |
| 2006/0168006 A1 | 7/2006 | Shannon et al. | |
| 2006/0168022 A1 * | 7/2006 | Levin et al. | 709/206 |
| 2006/0191008 A1 | 8/2006 | Fernando et al. | |

(56) References Cited

U.S. PATENT DOCUMENTS

| | | | |
|---|---|---|---|
| 2006/0206713 A1 | 9/2006 | Hickman et al. | |
| 2006/0253537 A1 | 11/2006 | Thomas | |
| 2006/0259948 A1 | 11/2006 | Calow et al. | |
| 2006/0265750 A1 | 11/2006 | Huddleston | |
| 2006/0277280 A1* | 12/2006 | Craggs | 709/220 |
| 2006/0288076 A1 | 12/2006 | Cowings et al. | |
| 2007/0005762 A1 | 1/2007 | Knox et al. | |
| 2007/0011739 A1 | 1/2007 | Zamir et al. | |
| 2007/0028302 A1 | 2/2007 | Brennan et al. | |
| 2007/0078936 A1* | 4/2007 | Quinlan et al. | 709/206 |
| 2007/0083929 A1 | 4/2007 | Sprosts et al. | |
| 2007/0124388 A1 | 5/2007 | Thomas | |
| 2007/0130351 A1 | 6/2007 | Alperovitch et al. | |
| 2007/0156833 A1 | 7/2007 | Nikolov et al. | |
| 2007/0195779 A1 | 8/2007 | Judge et al. | |
| 2007/0260602 A1 | 11/2007 | Taylor | |
| 2007/0282952 A1 | 12/2007 | Lund et al. | |
| 2007/0294352 A1 | 12/2007 | Shraim et al. | |
| 2007/0299915 A1 | 12/2007 | Shraim et al. | |
| 2008/0077517 A1 | 3/2008 | Sappington | |
| 2008/0082662 A1 | 4/2008 | Dandliker et al. | |
| 2008/0086372 A1 | 4/2008 | Madhavan et al. | |
| 2008/0184366 A1* | 7/2008 | Alperovitch et al. | 726/22 |
| 2008/0208980 A1 | 8/2008 | Champan et al. | |
| 2008/0222253 A1 | 9/2008 | Bond et al. | |
| 2008/0250106 A1 | 10/2008 | Rugg et al. | |
| 2008/0267144 A1 | 10/2008 | Jano et al. | |
| 2008/0295177 A1 | 11/2008 | Dettinger et al. | |
| 2009/0138573 A1 | 5/2009 | Campbell et al. | |
| 2010/0106781 A1* | 4/2010 | Gupta | 709/206 |
| 2010/0205265 A1* | 8/2010 | Milliken et al. | 709/206 |
| 2011/0087735 A1* | 4/2011 | Anderson | 709/204 |
| 2012/0159620 A1 | 6/2012 | Seifert et al. | |

FOREIGN PATENT DOCUMENTS

| | | |
|---|---|---|
| EP | 1 058 199 | 5/2000 |
| EP | 1 180 889 | 2/2002 |
| EP | 1 278 136 | 1/2003 |
| EP | 1 278 330 | 1/2003 |
| EP | 1 280 040 | 1/2003 |
| EP | 1 318 468 | 6/2003 |
| EP | 1 329 117 | 7/2003 |
| EP | 1 457 885 | 9/2004 |
| EP | 1 484 893 | 12/2004 |
| EP | 1 494 409 | 1/2005 |
| EP | 1 510 945 | 3/2005 |
| EP | 1 638 016 | 3/2006 |
| EP | 1 643 701 | 4/2006 |
| GB | 2418330 | 3/2006 |
| JP | 10 243018 | 9/1998 |
| JP | 2000-235540 | 8/2000 |
| JP | 2000 235540 A | 8/2000 |
| WO | WO 92/19054 | 10/1992 |
| WO | WO 96/05549 A1 | 2/1996 |
| WO | WO 96/42041 | 12/1996 |
| WO | WO 01/24012 | 4/2001 |
| WO | WO 01/33371 | 5/2001 |
| WO | WO 01/55873 | 8/2001 |
| WO | WO 01/55905 | 8/2001 |
| WO | WO 01/63835 | 8/2001 |
| WO | WO 01/75651 | 10/2001 |
| WO | WO 2004/077710 | 9/2004 |
| WO | WO 2005/010692 | 2/2005 |
| WO | WO 2005/017708 | 2/2005 |
| WO | WO 2005/022319 | 3/2005 |
| WO | WO 2005/074213 | 8/2005 |
| WO | WO 2005/119488 | 12/2005 |
| WO | WO 2006/027590 | 3/2006 |
| WO | WO 2006/030227 A1 | 3/2006 |
| WO | WO 2006/062546 | 6/2006 |
| WO | WO 2006/136605 | 12/2006 |
| WO | WO 2008/008339 | 1/2008 |

OTHER PUBLICATIONS

United Kingdom Search Report for Application No. GB0417620.2 and Combined Search and Examination Report, UKIPO, Oct. 8, 2004.

Abiteboul, et al., The Lorel query language for semistructured data, Int'l Journal on Digital Libraries, Apr. 1, 1997, vol. 1, Issue 1, pp. 68-88.

C. L. Schuba and E. H. Spafford, Countering abuse of name-based authentication, Pub: In 22nd Annual Telecommunications Policy Research Conference, 1996, pp. 21.

Chawathe, et al., Representing and querying changes in a semistructured data, Proceedings from 14th Int'l Conference, Feb. 23-27, 1998, pp. 4-13.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting Dec. 13, Issue XP000601363, pp. 41-48, Sections 1,3., London.

Dell Zhang, et al., A data model and algebra for the web, Proceedings 10th Int'l Workshop on Florence, Italy, Sep. 1-3, 1999, pp. 711-714.

European Search Report for Application No. 02255055.2, EPO, Jul. 7, 2004.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=6882 7537> [retrieved on Dec. 7, 2007], Apr. 23-27, 2006, pp. 1166-1171.

Garcia-Molina et al., Database System Implementation, Department of Computer Science, Stanford University, Prentice Hall, 2000.

Gittler F., et al., The DCE Security Service, Pub: Hewlett-Packard Journal, Dec. 1995, pp. 41-48.

Goldman, R., et al., DataGuides: Enabling Query Formulation and Optimization in Semistructured Databases, Proceedings of the International Conference on Very Large Data Bases, Aug. 26, 1997, pp. 436-445.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application. Technical Report of IEICE, IEICE Association, Jan. 18, 2002, vol. 101, Issue 563, pp. 51-56, Japan.

International Search Report and Written Opinion for International Application No. PCT/GB2005/003482, Dec. 9, 2005.

International Search Report and Written Opinion for PCT Application No. PCT/US2007/015730 dated Dec. 27, 2008, 16 pages.

International Search Report, International Application No. PCT/US2006/049149, Mailed Mar. 10, 2008, 4 pages.

IronPort Web Reputation: Protect and Defend Against URL-Based Threats; Ironport Systems, Apr. 2006, 8 pages.

IronPort Web Reputation White Paper, A Comprehensive, Proactive Approach to Web-Based Threats, Ironport Systems, 2009, pp. 10.

Microsoft Press Computer Dictionary, 3rd edition, Pub: Microsoft Press, 1997, pp. 262, 276.

Molitor, Andrew, An Architecture for Advanced Packet Filtering, Proceedings for the Fifth Usenix Unix Security Symposium, Jun. 1995, pp. 1-11.

Nestorov, et al., Representative objects: concise representations of semistructured, hierarchical Data, Proceedings, 13th Int'l Conference in Birmingham, UK, Apr. 4-11, 1997, pp. 79-90.

Newman, H., A Look at Some Popular Filtering Systems, Pub: Internet, Online!, Jul. 25, 1999, pp. 1-11.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

(56) References Cited

OTHER PUBLICATIONS

Roberts-Witt, S., The 1999 Utility Guide: Corporate Filtering, Pub: PC Magazine Online, Apr. 5, 1999, pp. 1-11.

Sandhu, et al., Access Control: Principles and Practice, IEEE Communications Magazine, Sep. 1994, pp. 40-48.

Sequel Technology, Inc., Sequel and Surfwatch Partner to Provide Innovative Internet Resource Management Tools for Large Enterprises, Pub: Internet, Online!, Feb. 25, 1999, pp. 1-3.

Snyder, J., A Flurry of Firewalls, www.opus1.com/www/jms/nw-firewall.html, Network World, Jan. 29, 1996, pp. 1-8.

Stein, Web Security—a step by step reference guide, Addison-Wesley, 1997, pp. 387-415.

Supplementary European Search Report for EPO App. No. 00 90 7078, May 18, 2004.

SurfControl PLC, SuperScout Web Filter Reviewer's Guide, 2002, pp. 36.

SurfWatch Software, SurfWatch® Professional Edition: Product Overview, Pub: Internet, Online!, May 26, 1999, pp. 1.

Symantec Corporation, E-security begins with sound security policies, Announcement Symantec, XP002265695, Jun. 14, 2001, pp. 1, 9.

Williams, R., Data Integrity with Veracity, Retrieved from the Internet: <URL: ftp://ftp.rocksoft.com/clients/rocksoft/papers/vercty10.ps>, Sep. 12, 1994.

Yialelis, et al., Role-Based Security for Distributed Object Systems, Proceedings of the IEEE Fifty Workshops on Enabling Technology: Infrastructure for Collaborative Enterprises, WET ICE '96, Jun. 19-21, 1996, pp. 6.

Zhang et al., The Role of URLs in Objectionable Web Content Categorization, Web Intelligence, 2006.

"Google + StopBadward.org = Internet Gestapo?", http://misterpoll.wordpress.com/2007/01/05/google-stopbadwareorg-internet-gestapo/, Jan. 5, 2007.

"Trends in Badware 2007", StopBadware.org.

George, Erica, "Google launches new anti-badware API", http://blog.stopbadware.org//2007/06/19/google-launches-new-anti-badware-api, Jun. 19, 2007.

Hubbard, Dan, Websense Security Labs, The Web Vector: Exploiting Human and Browser Vulnerabilities, Toorcon 2005 (http://www.toorcon.org).

Wang et al., MBF: a Real Matrix Bloom Filter Representation Method on Dynamic Set, 2007 IFIP International Conference on Network and Parallel Computing—Workshops, Sep. 18, 2007, pp. 733-736, Piscataway, NJ, USA.

European Search Report for Application No. 02258462.7, Jan. 30, 2006.

Adam Lyon, "Free Spam Filtering Tactics Using Eudora,", May 21, 2004, pp. 1-4.

PCT International Search Report for Application No. PCT/EP2006/063474, PCT, Sep. 2006.

Secure Computing Corporation, SmartFilter™ Web Tool, Dec. 1, 1998, pp. 1-2.

Wobus, J., DHCP FAQ, www.nd.edu/~milind/FAQs/FAQ_dhcp, Dec. 29, 1995, pp. 1-10.

International Search Report and Written Opinion dated Jun. 30, 2008 for PCT Patent Application No. PCT/US2007/024557.

Ma et al., Beyond Blacklists: Learning to Detect Malicious Web Sites from Suspicious URLs, Department of Computer Science and Engineering, University of California, San Diego, Jun. 2009, pp. 1245-1253.

International Search Report for PCT/US2010/035992, Aug. 11, 2010.

PCT International Search Report and Written Opinion for International Application No. PCT/US2008/052483, PCT, Feb. 11, 2009.

\* cited by examiner

METHOD AND APPARATUS FOR ELECTRONIC MAIL FILTERING

RELATED APPLICATIONS

This application is a continuation of and claims priority to U.S. patent application Ser. No. 12/600,631 filed Apr. 30, 2010, entitled "METHOD AND APPARTUS FOR ELECTRONIC MAIL FILTERING," which claims priority to PCT Application PCT/GB08/50347 filed May 13, 2008, which claims priority to Great Britain Patent Application 0709527.6, filed May 18, 2007, all of which are hereby incorporated by reference herein.

FIELD OF THE INVENTION

The present invention relates generally to the field of electronic messaging systems such as Internet email. More particularly, the present invention relates to a message processing apparatus and a message processing method for processing messages in an electronic messaging system.

DESCRIPTION OF THE RELATED ART

Electronic messaging systems of the related art come in various different forms, of which one particularly well known and widely used system is Internet e-mail. However, electronic messaging systems like Internet e-mail are inherently insecure and suffer from a large number of unwanted messages. As a result, many workers in this field have spent considerable effort developing mechanisms for filtering such unwanted messages. Most of these filtering mechanisms are based on intensive processing of messages to remove the unwanted messages, whilst allowing the wanted messages to proceed unhindered. In particular, these filtering mechanisms include anti-virus filtering mechanisms to automatically block messages containing viruses, worms, phishing attacks, spyware and Trojans as various forms of malicious message content. Further, anti-spam filtering mechanisms identify and block delivery of junk e-mail messages containing unsolicited advertising for products and services. Further still, content filtering mechanisms provide highly sophisticated lexical analysis of messages to automatically filter offensive terms in many different languages and also to identify messages which relate to certain words, terms and phrases where a filtering action is required in relation to privacy, confidentiality, a regulatory compliance requirement or other security concerns. It is often desirable to employ these differing technologies in combination to provide more effective multi-layered filtering. However, a problem arises in that these more complex filtering mechanisms and the combined use of multiple separate filtering mechanisms places heavy loads on the apparatus which perform these filtering functions. In many cases, these limitations of the hardware infrastructure are one of the main factors that inhibit growth of such electronic messaging systems.

In the related art, Internet email and SMTP (Simple Mail Transfer Protocol) are discussed in detail in RFC2821 of April 2001 (see www.rfc.net). SMTP runs over TCP/IP as discussed in detail in RFC793 of September 1981 and subsequent RFC publications.

SUMMARY

An aim of the present invention is to provide a message processing apparatus, and a message processing method, which improve efficiency in an electronic messaging system. More particularly, an aim of the present invention is to provide a message processing apparatus, and a message processing method, which assist in making more effective use of hardware which supports an electronic messaging system. A further aim of the present invention is to provide a message processing apparatus and method which allow an electronic messaging system to operate more efficiently, particularly in relation to unwanted messages.

According to the present invention there is provided an apparatus and method as set forth in the appended claims. Other, optional, features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

The exemplary embodiments of the present invention provide a message processing apparatus arranged to process electronic messages on a communication path between a client unit and a server unit. The message processing apparatus holds an ordered queue of the electronic messages and adds a new incoming message to the queue according to a reputation score allocated to the incoming message by a reputation scoring unit. Messages having a highest reputation score are then extracted from a top of the queue for detailed analysis in a message analysis unit according to one or more filtering mechanisms. Where the analysis determines the message to be a wanted message, a message forwarding unit then performs onward transmission of the wanted message along the communication path towards the recipient terminal. By contrast, messages having a lower reputation score remain in the queue. Thus, the message analysis unit is directed to concentrate the available hardware resources towards the messages having the highest allocated reputation scores—which are most likely to be wanted messages.

Notably, the exemplary embodiments allocate the reputation score according to a client identity associated with the client unit in relation to the incoming message. Thus, messages from a trusted client who is most likely to send wanted messages are allocated a high reputation score and are quickly passed through the queue. Messages from a non-trusted or unknown client are allocated a low reputation score and remain in the queue until all messages with a higher reputation score have been extracted.

The exemplary embodiments provide a queue that is self-organized in relation to loading conditions of the system. That is, messages having a high reputation score quickly reach the top of the queue and are extracted for onward processing towards the server unit, whereas messages having a low reputation score are added at a lowly position on the queue and will only be forwarded when the loading conditions of the system allow, and at the busiest times are discarded even before being added to the queue.

The exemplary embodiments have further advantages in that at times when the system is relatively quiet then more messages having a relatively low reputation score will be passed through the queue and are then available for detailed analysis in the message processing apparatus to improve future allocated reputation scores. Thus, the queuing system provides a load-balancing effect and allows the message processing apparatus to concentrate the available resources on dealing with mostly wanted messages during key business hours, whilst also exposing the system to sufficient unwanted messages during an overnight sampling period to maintain a high degree of accuracy in relation to allocated reputation scores.

The exemplary system includes a connection unit arranged to maintain an incoming connection in relation to the incoming message. This connection is maintained until the message is removed from the queue, and is thus maintained during the initial phase of allocating a reputation score and whilst the message resides in the queue.

In the exemplary embodiments, each message is associated with a respective total time to live (TTL). If the TTL expires before a particular message is extracted from the head of the queue, then that message is discarded and the connection is closed. Thus, messages having a low reputation score are discarded if the total time to live expires before those messages reach the top of the queue.

The exemplary embodiments further provide that the queue has a predetermined maximum size. When the system is busy and the queue is already full, an incoming message having a low reputation score is not added to the queue. Here, the message is discarded and the incoming connection for that message is closed.

In the exemplary embodiments, only messages having a reputation score higher than at least one message already on the queue are added to the queue when the queue has already reached the predetermined maximum permitted size. Thus, in this case, one or more messages having a low reputation score are discarded from a bottom of the queue in favor of a new incoming message having a higher reputation score.

The exemplary embodiments are particularly useful in the context of Internet e-mail, wherein mail delivery protocols (i.e. SMTP) allow a connection for an incoming message to be held open for a limited time period and during this period the message processing apparatus does not assume responsibility for onward transmission of the message. Thus, the message processing apparatus is able to selectively accept only those messages having a highest reputation score for detailed analysis, without adversely affecting the operations performed by other parts of the electronic messaging system.

In a further aspect of the present invention there is provided an electronic messaging system incorporating the message processing apparatus discussed herein.

In a still further aspect of the present invention there is provided a message processing method which performs the steps discussed herein.

In a yet further aspect of the present invention there is provided a computer-readable storage medium having recorded thereon instructions executable by a computer to perform the message processing method discussed herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be embodied in software, or as a combination of software and hardware. Here, the software is configured to reside on an addressable storage medium and is configured to execute on one or more processors. The medium may take any suitable structure including an optical medium such as CD or DVD, a magnetic medium such as tape, floppy disk, or hard disk, or a solid-state medium such as dynamic or static random access memories (DRAMs or SRAMs), erasable and programmable read-only memories (EPROMs), electrically erasable and programmable read-only memories (EEPROMs) and flash memories. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed herein, such functional elements may be combined into fewer elements or separated into additional elements.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE EXEMPLARY EMBODIMENTS OF THE INVENTION

The exemplary embodiments of the present invention will be discussed in detail in relation to Internet e-mail systems which send electronic messages under SMTP. However, the teachings, principles and techniques of the present invention are also applicable in other exemplary embodiments. For example, embodiments of the present invention are also applicable to other electronic messaging systems including in particular messaging systems which perform store-and-forward type messaging. Here, exemplary systems include SMS (Short Message Service), MMS (Multimedia Messaging Service) and 1M (Instant Messaging) systems, which will all benefit from the teachings of the present invention.

Figure 1:
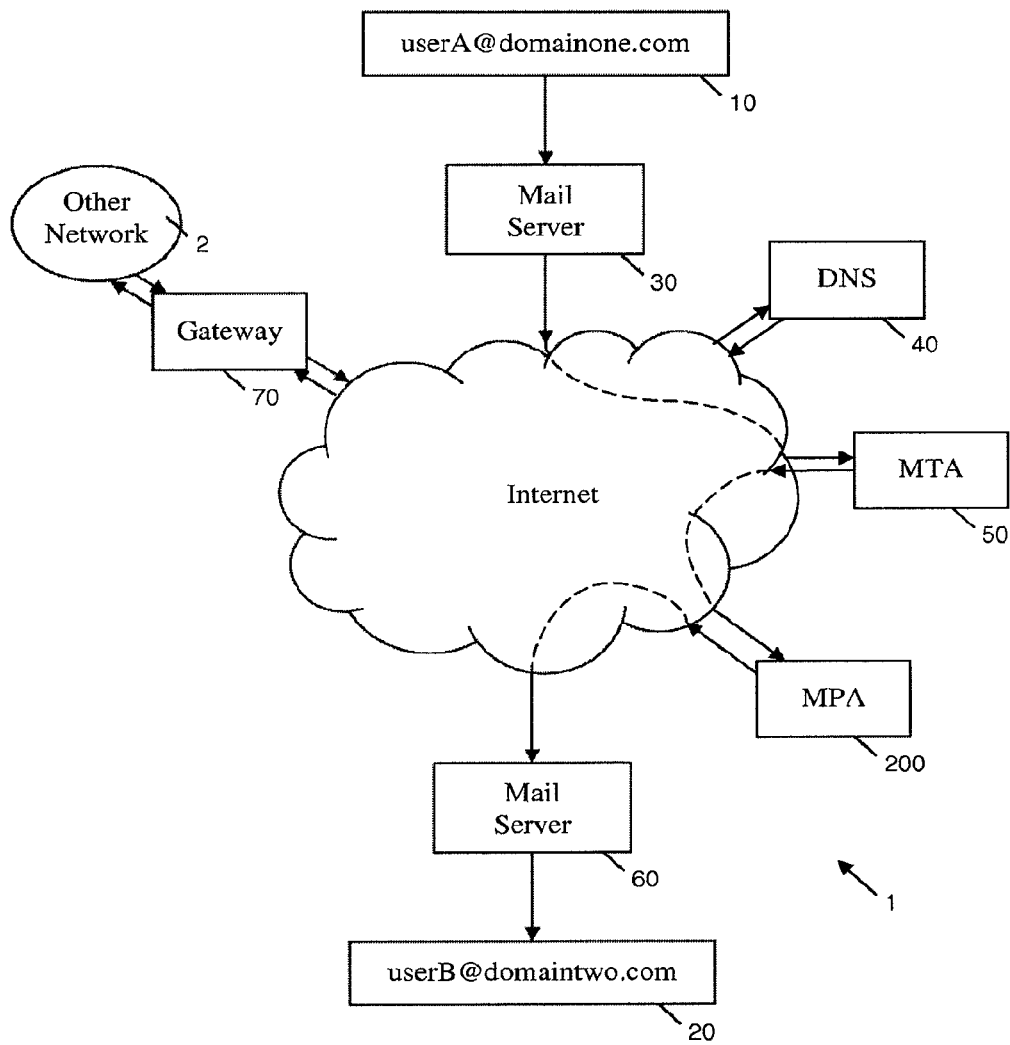
FIG. 1 is a schematic overview of an electronic messaging system for Internet e-mail relating to embodiments of the present invention.

FIG. 1 is a schematic overview of an Internet e-mail system in which embodiments of the present invention are applicable.

In FIG. 1, the messaging system comprises a sending terminal 10, a recipient terminal 20, a originating mail server 30, a receiving mail server 60, a Domain Name Server (DNS) 40, one or more gateways 70, and one or more relays or Mail Transfer Agents (MTA) 50. These elements are connected together in a network, which here is based on Internet Protocol (IP). Further, the messaging system of FIG. 1 comprises at least one message processing apparatus (MPA) 200 according to the exemplary embodiments of the present invention.

In general terms, a message is transmitted through the messaging system 1 from the sending terminal 10 to the receiving terminal 20, and will pass through one or more of the other elements along the way. The sending terminal 10 is identified by a sender identity, which for Internet email gives the address of the sender's mailbox—in this example <userA@domainone.com>. Similarly, the recipient terminal 20 is identified by a recipient identity—in this example <userB@domaintwo.com>. As will be familiar to those skilled in the art, typically an e-mail message is prepared by an end-user mail program and sent from the sending terminal 10 to the local mail server 30, which may reside on the same local area network as the sending terminal 10 or may reside elsewhere such as at an Internet Service Provider (ISP). The mail server 30 refers to the Domain Name Server (DNS) 40 to determine a delivery path with respect to the recipient identity. Here, the DNS 40 supplies a Mail eXchange (MX) record associated with the recipient. The originating mail server 30 then forwards the e-mail to a next element of the electronic messaging system according to the MX record, until eventually the message reaches the local mail server 60 associated with the recipient terminal 20. This receiving mail server 60 hosts the mailbox addressed by the recipient identity <userB@domaintwo.com>ready for the recipient terminal 20 to access the transmitted message.

As shown in FIG. 1, the electronic messaging system includes one or more relay servers or message transfer agents (MTAs) 50. One of these MTAs 50 is usually set as the target of the MX record of the recipient identity at the DNS 40 and the MTA 50 may then accept or reject the task of relaying the message toward the recipient. If the relay server 50 accepts this task, then the relay server now assumes responsibility for establishing a transmission channel to the next specified element in the system.

The exemplary message processing apparatus (MPA) 200 is arranged to intercept messages using store-and-forward type interception. The MPA 200 is provided at any suitable point in the system 1 prior to the messages reaching the receiving mail server 60, or at least prior to the messages reaching the receiving terminal 20.

In a first embodiment as illustrated in FIG. 1 and considered in more detail below, the MPA 200 is arranged to function as a mail transfer agent. That is, the MX record held by the DNS 40 is configured to direct email messages intended for the recipient identity of the receiving terminal 20 to the message processing apparatus 200. These messages are processed by the message processing apparatus 200 to remove (e.g. quarantine) unwanted messages. The remaining wanted messages are then delivered from the message processing apparatus 200 to the receiving mail server 60 as a cleaned message stream ready for the receiving terminal 20.

In a second exemplary embodiment, the MPA 200 is arranged to function in co-operation with the receiving mail server 60. In a third exemplary embodiment, the MPA 200 is arranged to function in co-operation with the receiving terminal 20. Here, the MPA 200 is most conveniently provided as a hardware appliance which is arranged in use to perform the message processing operations discussed herein. These embodiments of the MPA 200 are most conveniently provided as a stand-alone appliance, such as a rack-mounted unit with cabling ports to connect the MPA inline with the stream of incoming and outgoing messages.

For completeness, FIG. 1 also shows a gateway 70 which acts as a transfer point between networks. That is, the gateway 70 is arranged to transfer messages between two different IP-based networks, or from the exemplary IP-based network 1 to another non-IP network 2—such as the GSM cellular network for SMS messages. Thus, the gateway 70 allows electronic messages to enter and leave the Internet email system 1 by bridging the system to another form or type of electronic messaging system.

Figure 2:
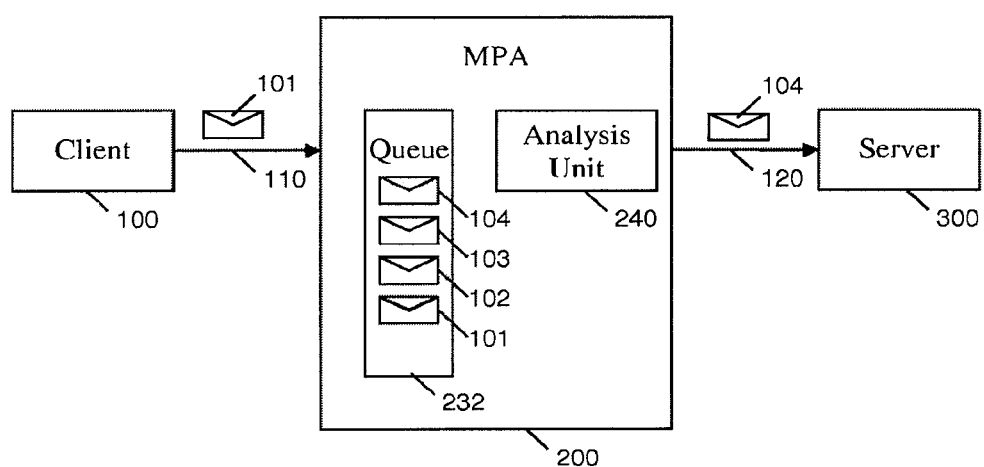
FIG. 2 is a schematic diagram illustrating an exemplary message processing apparatus.

FIG. 2 is a schematic diagram illustrating the exemplary message processing apparatus 200 in more detail, together with a client unit 100 and a server unit 300.

As shown in FIG. 2, the message processing apparatus 200 of the exemplary embodiment is arranged to make a SMTP connection 110 with a client unit 100 and receive an incoming e-mail message 101. In most cases, the client unit 100 is the originating mail server 30 or a message transfer agent 50 as discussed above. However, in other cases the client unit is the sending terminal 10, or some other part of the messaging system which is not shown in these exemplary drawings.

That is, the client unit 100 represents whichever upstream unit is sending the incoming message 101 to the message processing apparatus 200. In the terminology of SMTP email systems, the term "client" is understood to refer to any unit which is transmitting a message.

Similarly, the term "server" refers generally to any unit which is receiving a message. Hence, the server unit 300 represents whichever downstream unit now receives an outgoing message from the message processing apparatus 200. Typically, the server unit 300 will be the receiving mail server 60 or the receiving terminal 20 as discussed above. However, in other cases the server unit 300 will be another message transfer agent 50, or some other part of the messaging system which is not shown in these exemplary drawings.

The message processing apparatus 200 stores the incoming message 101 in a message queue 232, along with one or more other previously received messages 102, 103, 104 etc. A message analysis unit 240 is arranged to remove a topmost message from the message queue 232—in this case message 104—and then analyze the message with respect to one or more filtering functions which will be discussed in more detail below. Here, the message analysis unit 240 determines whether to allow or block onward transmission of the e-mail message. In particular, e-mail messages which are considered to be undesirable, such as viruses or junk e-mail are quarantined by the message analysis unit 240, whilst wanted e-mails are allowed to pass unhindered. In this case, the analyzed message 104 is determined to be a wanted message and therefore the message processing apparatus 200 opens an outgoing SMTP connection 120 and delivers the outgoing message 104 to the server unit 300 such that the outgoing message 104 is forwarded towards the intended recipient terminal 20. The message analysis unit 240 now returns to extract the next topmost message from the message queue 232 and the above process is repeated, until eventually the incoming message 101 reaches the top of the queue 232 to be extracted, analyzed and selectively forwarded to the server unit 300 toward the recipient terminal 20.

It will of course be appreciated that the messaging system discussed herein is arranged to deal with many hundreds of thousands or many millions of individual senders and recipients and thus the flow of e-mail messages occurs on a massive scale. The electronic messaging system has necessarily been simplified in this initial overview.

Figure 3:
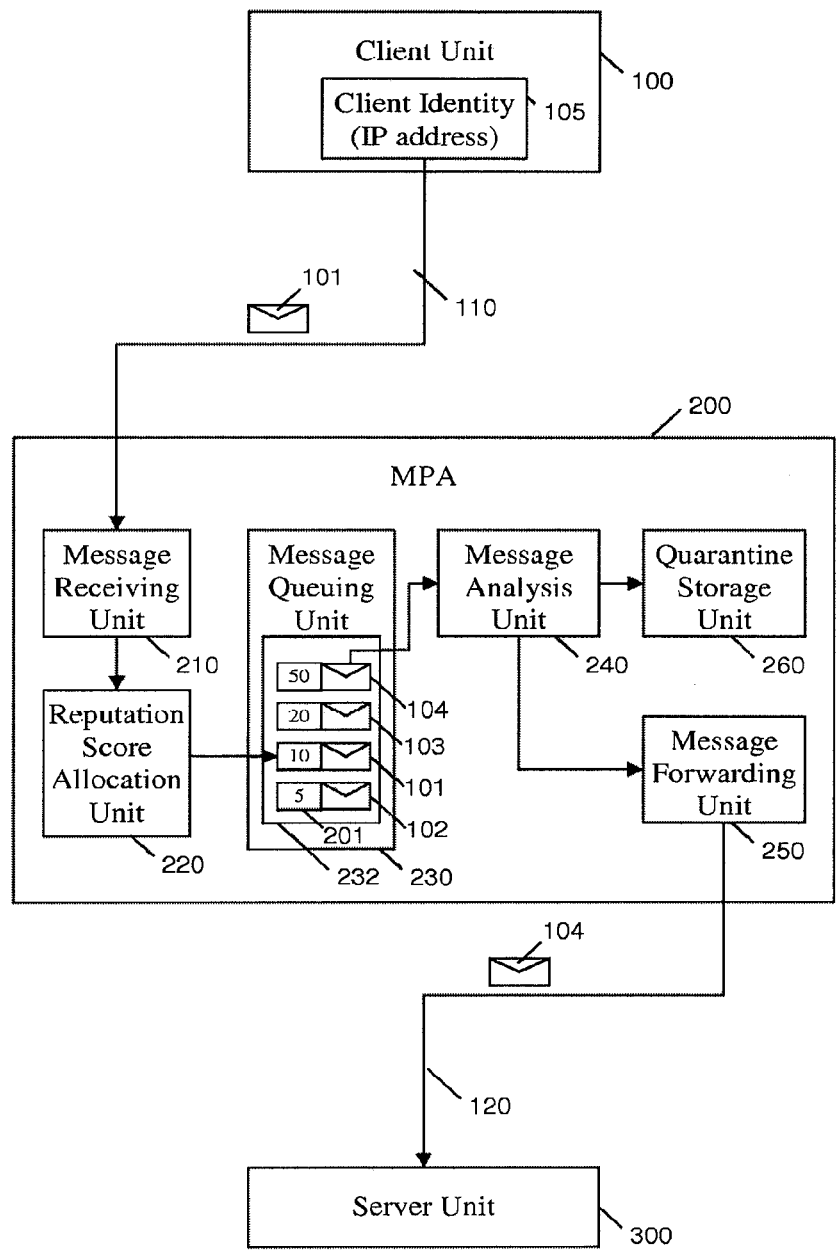
FIG. 3 is a more detailed schematic diagram of the message processing apparatus according to exemplary embodiments of the present invention.

FIG. 3 is a more detailed schematic diagram of the message processing apparatus 200 according to the exemplary embodiments of the present invention.

As shown in FIG. 3, the message processing apparatus 200 comprises the message analysis unit 240 discussed above, and further includes a message receiving unit 210, a reputation score allocation unit 220, a message queuing unit 230, a message forwarding unit 250, and a quarantine storage unit 260.

The message receiving unit 210 is arranged to receive the incoming e-mail message 101 over the incoming message connection 110 with the client unit 100, which in the exemplary embodiments is a SMTP connection. Here, the SMTP connection 110 is a connection supported by TCP/IP (Transmission Control Protocol over Internet Protocol). According to the Internet Protocol, the client unit 100 has a client identity 105 which is unique to the client unit 100 within the relevant IP network. As a simple example, the email messaging system runs on a private local area IP network and the client identity is thus a locally-unique IP address according to IPv6 or IPv4, such as <192.168.114.1>. In most practical embodiments, the client identity 105 is a globally unique IP address.

The message receiving unit 210 is arranged to determine the client identity 105 of the client unit 100 with respect to the incoming SMTP connection 110. In the exemplary embodiments, the IP address of the client unit is transmitted in the IP packet header. Also, it is relatively difficult for the client unit 100 to provide a false or misleading I P address 105, because of the three-way (three-step) handshake performed with the client unit 100 upon opening the SMTP connection. Thus, the client identity 105 is a relatively trustworthy identifier for the client unit 100.

The reputation score allocation unit 220 determines a reputation score for the incoming message 101 according to the client identity 105—in this case the IP address of the client unit 100 such as <192.168.114.1>. In the exemplary embodiments, the reputation score is a numerical value on a predetermined scale, such as a value on the scale from a to 100. In the example of FIG. 3, the allocated score is "10" for this particular incoming message 101.

The reputation score allocation unit 220 appends a new data field 201 containing the allocated reputation score to the incoming message 101. This reputation score data field 201 is suitably appended to a header portion of the incoming message while the message is stored within the message processing apparatus 200. The reputation score data field is later removed or deleted from the message before the message is forwarded from the apparatus 200. Thus, the reputation score data field 201 is temporarily added to the message 101 in order to improve processing of the message within the message processing apparatus 200.

The message queuing unit 230 stores the incoming message 101 in the message queue according to the allocated reputation score 201. The message queue is numerically ordered according to the reputation score of each of a plurality of messages residing in the queue. In this example, the incoming message 101 with a score of "10" is placed above the previously received message 102 with a score of "5" and below the previously received messages 103 and 104 with scores of "20" and "50" respectively.

The message analysis unit 240 extracts the uppermost message from the queue 230, whereby the message 1 04 having the highest reputation score is extracted from the queue. The extracted message is then subject to a detailed analysis including performing one or more filtering functions—such as an anti-virus filtering function, an anti-spam filtering function and a lexical content filtering function, amongst others. As discussed above, these filtering functions require significant hardware resources in terms of processing power, memory, disc space and so on, and thus it is important to make best use of these hardware resources with respect to the stream of messages passing through the message processing apparatus 200.

In the exemplary embodiment, unwanted messages are diverted by the message analysis unit 240 into the quarantine storage unit 260. That is, the quarantine storage unit 260 is arranged to store unwanted messages as determined by the message analysis unit 240. The unwanted messages stored in the quarantine storage unit 260 are still available for separate treatment and analysis according to the requirements of the message processing apparatus 200. That is, the quarantine storage unit 260 may be used to later search and examine the stored unwanted messages and perhaps release any wanted messages which have been quarantined in error.

In other exemplary embodiments, the message analysis unit 240 may take other actions as a result of the various filtering functions employed. For example, the message analysis unit 240 is arranged to raise an alert notification message when an unwanted message is detected, but still allow the unwanted message to proceed through the system. As another example, the message analysis unit is arranged to mark unwanted messages (e.g. by appending the marker "JUNK" to a subject line of an email message), but to otherwise forward all messages. Many other specific implementations will be apparent to those skilled in the art, depending upon the purposes of the mail processing system and the environment in which it is deployed.

The message forwarding unit 250 is arranged to initiate the outgoing connection 120 and forward the wanted message 104 on from the message processing apparatus 200 to the next downstream server unit 300 and hence onward the recipient terminal 20.

Figure 4:
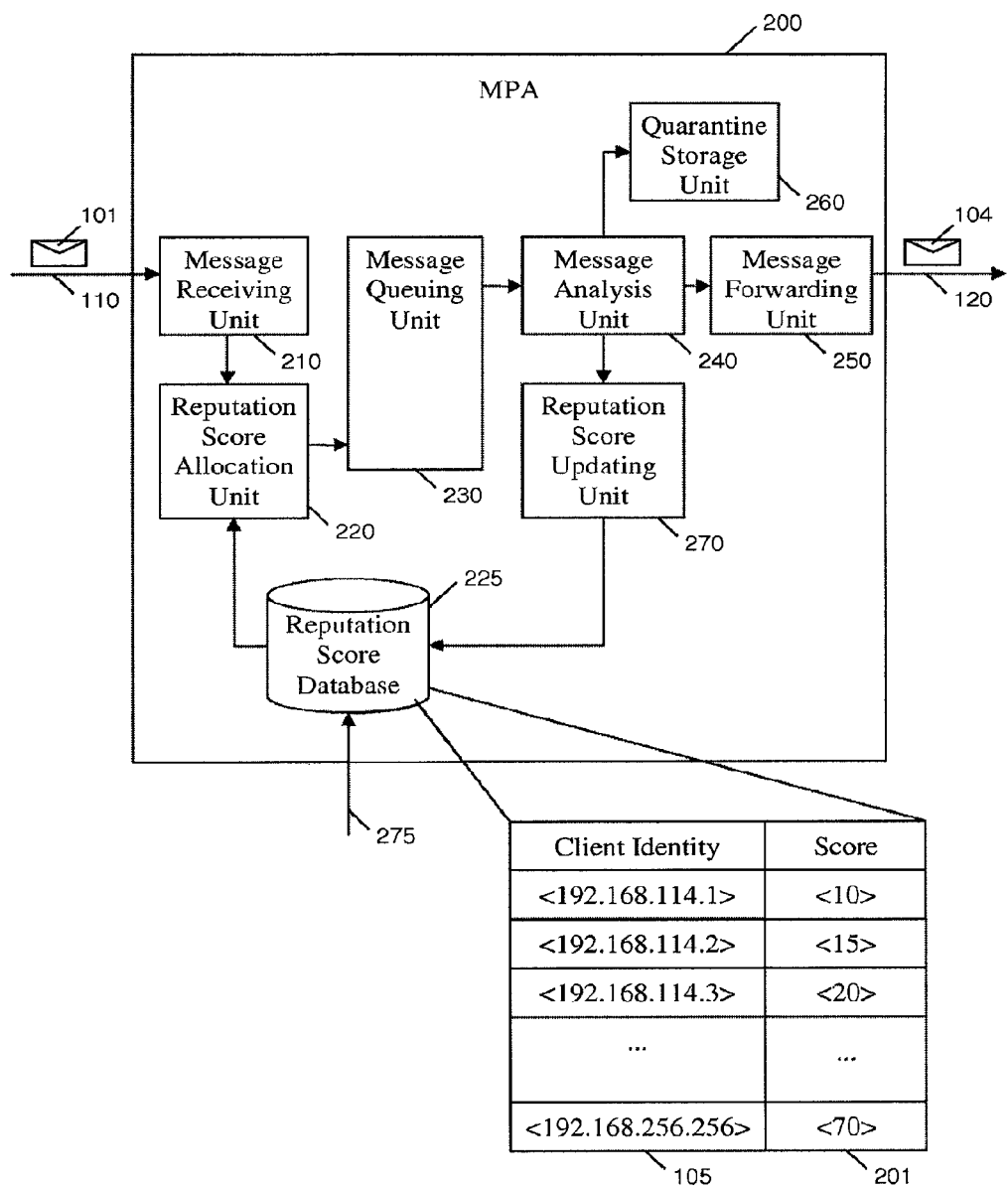
FIG. 4 is a schematic diagram showing the exemplary message processing apparatus in more detail.

FIG. 4 is a schematic diagram showing a further exemplary embodiment of the message processing apparatus.

As shown in FIG. 4, the reputation score allocation unit 220 comprises a reputation score database 225 which stores reputation scores according to a large number of already encountered client identities 105. Each of these client identities 105 has a corresponding reputation score 201 and, as noted above, the client identity 105 for a particular incoming message 101 allows a corresponding reputation score 201 to be derived appropriate to that incoming message. The reputation score database 225 is suitably embodied by any of the many commercially available fast access database technologies, such as a relational database management system. The reputation score database 225 is suitably provided locally within the message processing apparatus 200. However, alternate embodiments of the present invention allow the database 225 to be hosted remotely from the message processing apparatus 200, for example as a remote service available over the Internet.

In the exemplary embodiments, the reputation score database 225 stores of the order of 5 to 6 million known IP addresses with a corresponding reputation score for each of these client identities. It is envisaged that the reputation score database 225 will expand to hold 100 million or more IP addresses as more client units are encountered and analyzed by the system and the system becomes more experienced. Thus, the reputation score allocation unit 220 is able to allocate a reputation score for almost all incoming messages. However, where the client identity is not available in the reputation score database 225, then the reputation score allocation unit 220 allocates a default reputation score. In the exemplary embodiments, the default score is weighted to allow the incoming message to pass through the message queue for analysis by the message analysis unit 240.

As also shown in FIG. 4, the message processing apparatus 200 further includes a reputation score updating unit 270. Here, the reputation score updating unit 270 is arranged to update the reputation scores 201 stored in the reputation score database 225, including adding new database entries and replacing or amending existing values. In particular, the reputation score updating unit 270 is arranged to communicate with the message analysis unit 240 to update the reputation score 201 associated with a particular client identity 105.

Here, the reputation score updating unit 270 sets a high reputation score associated with those client identities which send a high proportion of wanted messages as determined by the filtering functions performed by the message analysis unit 240. Thus, a client identity 105 is determined to be a trusted and reliable source from experience in analyzing the messages from that client. By contrast, a client identity 105 which is associated with a high proportion of unwanted messages as determined by the filtering functions performed by the message analysis unit 240 is associated with a low reputation score 201. Further, the reputation score updating unit 270 is arranged to update existing reputation scores according to new messages received from a particular client identity, so that the reputation score better reflects the experience of the message processing apparatus 200 in dealing with that particular client identity. The reputation score updating unit 270 is arranged to update the reputation score database 225 with the one or more newly determined reputation scores, which are then available for use by the reputation score allocation unit 220 with respect to subsequent incoming messages.

In further exemplary embodiments of the present invention, a plurality of the message processing apparatuses 200 are provided at various different locations within the electronic messaging system. These message processing apparatuses 200 are arranged to co-operate, whereby the stored reputation scores are updated by such co-operation between the message processing apparatuses. In FIG. 4, a communication line 275 represents the external updating of the reputation score database 225 in the message processing apparatus 200 with reference to an external source such as a reputation score updating unit 270 in another of the message processing apparatuses.

In the exemplary embodiments, the reputation score updating unit 270 sets an updated reputation score 201 according to the volume of traffic received from a particular client identity 105, the rate at which the traffic is received (e.g. messages per day or messages per hour) and a percentage of that message traffic which is considered to be unwanted messages. Here, the reputation score updating unit 270 determines an updated reputation score associated with a particular client identity 105 according to statistics derived from a history of previous messages from the particular client identity 105.

It is desirable that the exemplary reputation score updating unit 270 is exposed both to wanted messages from trusted sources and also to a large number of unwanted messages—so that reputation scores are created and updated with respect to a large body of non-trusted client identities. Here, the message queuing unit 230 restricts the number and type of messages which enter the message analysis unit 240 for detailed analysis so that, in busy periods such as during key daytime business hours, the message analysis unit 240 is devoted mostly to the processing of wanted messages passing through the message processing apparatus 200. By contrast, during quieter periods the message queuing unit 230 now allows messages having a lower reputation score through to the message analysis unit 240 and in consequence the reputation score updating unit 270 is now better able to update the reputation scores associated with client identities which send large quantities of unwanted messages. The inventor has noted that typical behavior of the electronic messaging system is that many unwanted messages are sent out of key business hours—such as overnight. Thus, the message processing apparatus 200 effectively uses the quieter off-peak periods to perform sampling and analysis of the unwanted message traffic in order to provide more accurate and more effective reputation scores, but without detracting from the processing of wanted message traffic.

Figure 5:
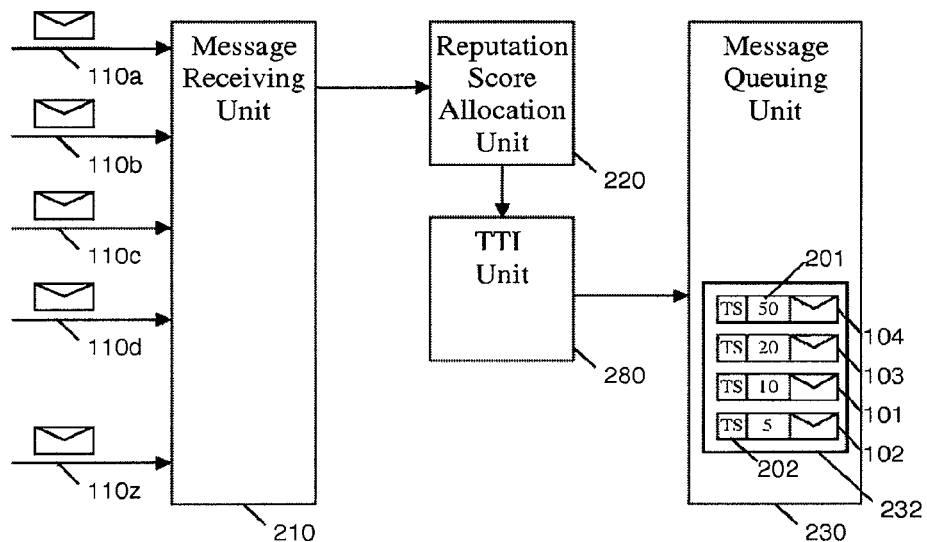
FIG. 5 is a schematic diagram showing further details of the exemplary message processing apparatus.

FIG. 5 is a schematic diagram further showing the exemplary message processing apparatus in more detail.

As shown in FIG. 5, the message receiving unit 210 is arranged to simultaneously hold open many incoming connections 110a-110z each associated with a corresponding incoming message. In the exemplary e-mail messaging system, each of these connections 110a-z is a separate SMTP connection over TCP/IP. Here, the message processing apparatus 200 will in practice hold open many hundreds or even many thousands of connections simultaneously.

As will be familiar to those skilled in the art, the SMTP protocol has four main stages in order to complete the transmission of an incoming email message from the client unit 100 (see FIG. 2) to the message processing apparatus 200:

1. Session Initiation.
2. Client Initiation (HELO or EHLO message).
3. Mail Transaction (MAIL command followed by a sender identity, e.g. FROM: <userA@domianone.com>, followed by recipient identity, e.g. RCPT: userB@domiantwo.com, then followed by a DATA command and a payload of the message).
4. Session Termination (e.g. a QUIT command from the client followed by a 221-type acknowledgement from the MPA 200 in reply).

Here, the message receiving unit 210 holds open each of the connections 110a-110z whereby the message processing apparatus 200 does not, at this stage, accept responsibility for the incoming messages. Only when the message receiving unit 210 acknowledges receipt of the complete message payload (e.g. by sending a 250-type control command) does the message processing apparatus 200 assume responsibility for onward transmission of that incoming message.

Conveniently, this configuration enables the message receiving unit 210 to hold open each connection while the reputation score allocation unit 220 allocates the reputation score 201 to the incoming message and the message queuing unit 230 holds the incoming message on the message queue. The connection is held open until the incoming message 101 is removed from the queue. As discussed above, messages having a higher reputation score quickly reach the top of the queue and are extracted by the message analysis unit. However, some messages are also removed from lower positions in the queue, as will now be discussed in more detail.

As shown in FIG. 5, the message processing apparatus 200 further comprises a TTL (Total Time to Live) timing unit 280 arranged to allocate and monitor a timing field 202 associated with each of the messages 101-104 in the message queue 230 with respect to a permitted total time to live. In this example, the maximum total time to live that a particular message is allowed to reside in the queue is 60 seconds. Conveniently, the SMTP protocol specifically allows for delays in processing of messages sent over a SMTP connection 110 and thus the one-minute total time to live applied by the TTL timing unit 280 remains within the restrictions of the SMTP protocol. The timing field 202 is conveniently a time stamp (TS) allocated to each of the incoming messages. In this illustrated example of FIG. 5, the four messages 101-104 on the message queue 232 have arrived at different times. Comparing this time stamp field 202 with a current time allows the timing unit 280 to determine those messages in the queue where the permitted total time to live has expired. In which case, the TTL timing unit 280 signals the message receiving unit 210 to terminate the respective connection 110 for that message so that the message transaction is not successfully completed. Here, the message receiving unit 210 sends a failure command to the relevant client, such as a 421 type command indicating that the transmission channel is being closed. Also, the TTL timing unit 280 removes the timed-out message from the queue 232 and that message is discarded.

Figure 6:
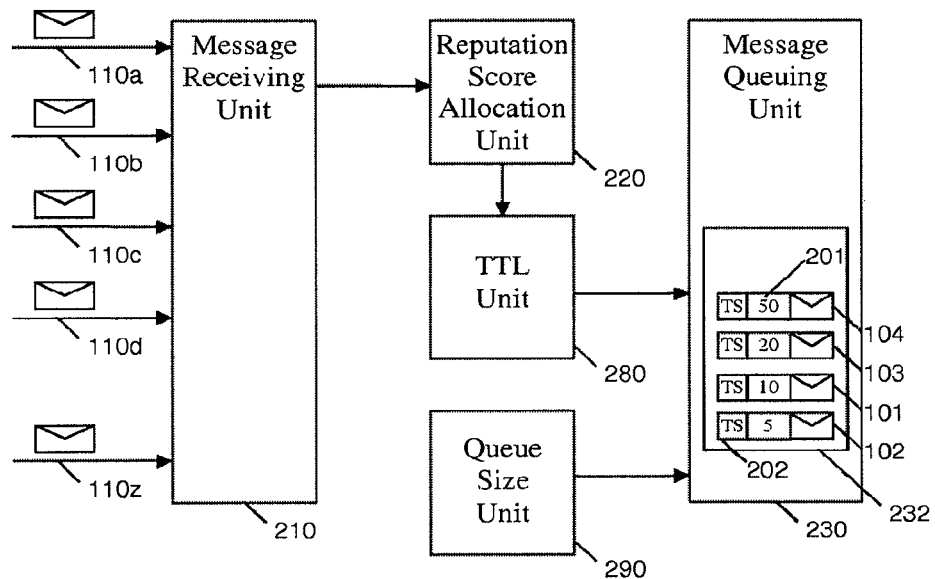
FIG. 6 is a schematic diagram showing further details of the exemplary message processing apparatus.

FIG. 6 is a schematic diagram showing further details of the exemplary message processing apparatus.

As shown in FIG. 6, the exemplary message processing apparatus 200 further comprises a queue size unit 290 arranged to control a size of the message queue held by the message queuing unit 230. In particular, the queue size unit 290 imposes a maximum size on the message queue 230. Suitably, the maximum queue size is determined with respect to the number of messages within the queue and/or the total quantity of data held within the queue. Here, the queue size unit 290 does not permit new messages to be added to the queue when the predetermined maximum size has already been reached. In this case, the incoming message is rejected with an error command (such as a 452-type command indicating "insufficient storage") and the incoming connection is closed.

In the exemplary embodiments, the queue size unit 290 is arranged to remove one or more messages from the message queue 232 having a relatively low allocated reputation score in order to make room on the queue 232 to add a new incoming message having a higher reputation score. The queue size unit 290 signals the message receiving unit 210 to close the incoming connection 110 for the removed messages, and then those messages are discarded. Thus, the queue size unit 290 selectively removes messages having a low reputation score in favor of new messages having a higher reputation score, whilst maintaining the predetermined maximum size of the message queue. Thus, in the busiest periods, the higher reputation scored messages are given priority over messages having a lower reputation score.

The exemplary embodiments have many advantages as have been discussed herein. In particular, the exemplary embodiments enable hardware resources within the message processing apparatus to be concentrated on messages having a higher reputation score and which are most likely to come from client identities that transmit wanted messages. However, the message queuing system still allows detailed in depth analysis of messages from senders having a lower reputation score and provide effective load balancing over typical operational cycles of the system.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of prioritizing messages, comprising:
receiving one or more first incoming messages from a computer network, the incoming messages having a reputation score below a first threshold;
adding the one or more first incoming messages to a receiving queue;
receiving a second incoming message from the computer network, the second incoming message having a reputation score above the first threshold;
determining via electronic processing circuitry that the receiving queue's content is above a capacity threshold;
in response to the determination that the content is above the capacity threshold, selecting a first queued message for removal from the receiving queue based on the selected message having a reputation score below the first threshold;
removing the selected message from the receiving queue; and
adding the second incoming message to the receiving queue.

2. The method of claim 1, further comprising closing an incoming network connection for the removed message.

3. The method of claim 1, further comprising discarding the removed message.

4. The method of claim 1, further comprising removing a second queued message from the receiving queue, in response to the determination, the second queued message having a reputation score below the first threshold.

5. The method of claim 1, wherein the determining is based on a number of messages in the receiving queue or a total quantity of data held within the receiving queue.

6. The method of claim 1, wherein the selection of the first queued message is further based on the reputation score of the first queued message being below reputation scores of other queued messages which have reputation scores that are below the first threshold.

7. A message prioritizing apparatus, comprising:
a processor;
a memory operably connected to the processor, and the memory configured to store:
a message receiving unit configured to receive incoming electronic messages;
a reputation score allocation unit configured to allocate a reputation score to the incoming electronic messages;
a message queuing unit configured to store the electronic messages in a message queue; and
a queue size unit configured to remove one or more electronic messages having a relatively low allocated reputation score from the message queue to make room on the queue to add a new incoming message having a higher reputation score.

8. The apparatus of claim 7, wherein the queue size unit is configured to signal the message receiving unit to close incoming connections for removed messages.

9. The apparatus of claim 7, further comprising a message analysis unit configured to extract-from the message queue a message with the highest reputation score of the messages stored in the message queue, and to analyze the extracted message.

10. The apparatus of claim 7, wherein the message receiving unit is further configured to:

receive each of the incoming messages over a network connection, hold open each network connection while the reputation score allocation unit allocates the reputation score to the incoming message and the message queuing unit holds the incoming message on the message queue, and close the network connection for a message when the message is removed from the message queue.

11. The apparatus of claim 10, wherein each of the incoming messages is received over a simple mail transfer protocol (SMTP) connection.

12. A non-transitory, computer readable medium storing instructions that when executed cause a processor to perform a method of:

receiving one or more first incoming messages from a computer network, the incoming messages having a reputation score below a first threshold;

adding the one or more first incoming messages to a receiving queue;

receiving a second incoming message from the computer network, the second incoming message having a reputation score above the first threshold;

determining that the receiving queue's content is above a capacity threshold;

in response to the determination that the content is above the capacity threshold, selecting a first queued message for removal from the receiving queue based on the selected message having a reputation score below the first threshold;

removing the selected message from the receiving queue; and adding the second incoming message to the receiving queue.

13. The non-transitory, computer readable medium of claim 12, further comprising instructions that cause the processor to close an incoming connection for the removed message.

14. The non-transitory, computer readable medium of claim 12, further comprising instructions that cause the processor to discard the removed message.

15. The non-transitory, computer readable medium of claim 12, further comprising instructions that cause the processor to remove a second queued message from the receiving queue in response to the determination, the second message having a reputation score below the first threshold.

16. The non-transitory, computer readable medium of claim 12, wherein the determining is based on a number of messages in the receiving queue or a total quantity of data held within the receiving queue.

17. A message prioritizing apparatus, comprising:

means for receiving one or more first incoming messages from a computer network, the incoming messages having a reputation score below a first threshold;

means for adding the one or more first incoming messages to a receiving queue;

means for receiving a second incoming message from the computer network, the incoming message having a reputation score above the first threshold;

means for determining that the receiving queue's content is above a capacity threshold;

means for selecting a first queued message for removal from the receiving queue based on the selected message having a reputation score below the first threshold, wherein the means for selecting is configured to select the first queued message in response to the means for determining's determination that the content is above the capacity threshold;

means for removing the selected message from the receiving queue; and means for adding the second incoming message to the receiving queue.

18. The apparatus of claim 17, further comprising means for closing an incoming connection for the removed message.

19. The apparatus of claim 17, further comprising means for discarding the removed message.

20. The apparatus of claim 17, further comprising means for removing a second queued message from the receiving queue in response to the determining, the second message having a reputation score below the first threshold based on the determining.

21. The apparatus of claim 17, wherein the determining is based on a number of messages in the receiving queue or a total quantity of data held within the receiving queue.

* * * * *